US006925746B2

(12) United States Patent
Huikari

(10) Patent No.: US 6,925,746 B2
(45) Date of Patent: Aug. 9, 2005

(54) MEANS FOR TRANSPORTING A BAIT

(75) Inventor: Jukka Huikari, Hameenlinna (FI)

(73) Assignee: Vilco Oy, Hameenlinna (FI)

( * ) Notice: Subject to any disclaimer, the term of this patent is extended or adjusted under 35 U.S.C. 154(b) by 79 days.

(21) Appl. No.: 10/471,837

(22) PCT Filed: Mar. 15, 2002

(86) PCT No.: PCT/FI02/00213

§ 371 (c)(1),
(2), (4) Date: Sep. 15, 2003

(87) PCT Pub. No.: WO02/080665

PCT Pub. Date: Oct. 17, 2002

(65) Prior Publication Data

US 2004/0083642 A1 May 6, 2004

(30) Foreign Application Priority Data

Mar. 15, 2001 (FI) .............................. 20010520

(51) Int. Cl.[7] .............................................. A01K 89/00
(52) U.S. Cl. .............................. 43/26.1; 43/4
(58) Field of Search .................... 43/4, 26.1, 255; 114/255

(56) References Cited

U.S. PATENT DOCUMENTS

| 2,709,316 | A | * | 5/1955 | McCabe | 43/26.1 |
| 3,710,500 | A | | 1/1973 | Pena | |
| 3,793,761 | A | * | 2/1974 | Bonham | 43/26.1 |
| 4,161,077 | A | * | 7/1979 | Ciaccio et al. | 43/26.1 |
| 4,442,621 | A | * | 4/1984 | Kent | 43/26.1 |
| 5,154,016 | A | * | 10/1992 | Fedora et al. | 43/26.1 |
| 5,165,193 | A | * | 11/1992 | Dankwardt | 43/26.1 |
| 5,265,549 | A | | 11/1993 | Cernier | |
| 5,309,664 | A | * | 5/1994 | Wright | 43/26.1 |
| 5,363,587 | A | * | 11/1994 | Nordling | 43/26.1 |
| 5,581,932 | A | * | 12/1996 | Bell | 43/26.1 |
| 5,806,232 | A | * | 9/1998 | James | 43/26.1 |
| 6,041,537 | A | * | 3/2000 | Sullivan | 43/26.1 |
| 6,122,852 | A | * | 9/2000 | Mechling, IV | 43/4 |
| 6,520,105 | B2 | * | 2/2003 | Koda et al. | 114/255 |

FOREIGN PATENT DOCUMENTS

FR  2 715 534  8/1995

OTHER PUBLICATIONS http://store.accsstr.com/stores/313/images/fishing.cfm; John's R3els on Fishing an Hunting website.*
Derwent's abstract, No. 95–050354/07, Abstract of SU,1830235 (LIVENTSEV), Oct. 17, 1990.

* cited by examiner

Primary Examiner—Peter M. Ron
Assistant Examiner—Bethany L. Griles
(74) Attorney, Agent, or Firm—Young & Thompson

(57) ABSTRACT

Apparatus (1) for transporting a line (3) and any bait (2) attached to the line to the spot of fishing. The frame (11) of the transporting apparatus (1) comprises two elongated guide branches (11b; 11b'; 11b") connected by a support member (11a). The transporting apparatus (1) is actuated by a water-jet engine (4) provided in the guide branches (11). The line (3) is releasably connected to the line guide (5) of the transporting apparatus (1). The transporting apparatus has a receiver (7), which can be provided with control commands by a control apparatus (6). The invention also relates to a device for controlling the transporting apparatus, which is connected to the pole (8; 81) of the fishing device.

6 Claims, 4 Drawing Sheets

MEANS FOR TRANSPORTING A BAIT

BACKGROUND OF THE INVENTION

The invention relates to a means for transporting a line and a bait attached to the line to the spot of fishing, the frame of the means comprising two elongated guide branches connected by a support member, the means being actuated by means of a water-jet engine provided in the guide branches, and the line being releasably connected to the line guide of the means.

Persons fishing on the shore with a spinning lure or a hook and line with a worm often have problems in detecting the most likely place of the fish because of trees on the waterline or water plants growing on the shore. There are several prior art means for transporting a bait, such as a lure or a living bait, at the end of the fishing line to the desired spot of fishing. Such conventional means are usually mini-boats equipped with a propeller and power supply from a small electric or internal combustion engine. They are steered with a separate remote control shore. Thus, for instance, FR Patent Application 2 715 534 discloses one such fishing device known per se.

However, remote-controlled, mini-boats driven by electric or internal combustion engines often involve several drawbacks: the combustion engine is too loud for fishing and the propeller of mini-boats tend to get entangled with the line. Another drawback relates to the control of mini-boats: remote control devices devised for the control of miniature models have been used for remote control, and they are difficult to use in fishing, because the fisherman will not react quickly enough when the fish bites.

SUMMARY OF THE INVENTION

The purpose of the invention is to eliminate the shortcomings of prior art. Thus, the first objective of the invention is to provide a transporting means, with the aid of which the line and the bait attached to it can be guided exactly to the fishing spot without risk of the line being entangled in the propeller.

The objectives mentioned above are achieved with the transporting means of the invention.

The invention relates more particularly to a means for transporting the line and the bait attached to the line to the spot of fishing.

The frame of the means of the invention for transporting the line and the bait attached to the line to the spot of fishing has two elongated guide branches connected by a support member. The transporting means is actuated by means of a water-jet engine provided between the branches. The line is releasably connected to the line guide. The means also has a receiver, which can be given commands by a control device. The control device of the invention is connected to the pole of the fishing device.

The invention is based on the fundamental idea of using a water-jet engine as the power source of the transporting means, achieving the notable benefit of the engine of the transporting means not getting entangled with the line under any circumstances. The control device of the transporting means is connected directly to the pole of the fishing device and the transporting means has a line guide, the line passing through this being rapidly released so as to allow the fisherman to control the fishing process with the aid of the fishing device. This, in turn, yields the benefit of allowing the fisherman to react quickly to a fish biting the bait.

Among additional advantages achieved with the invention we note that, owing to the water-jet- engine used as the power source of the transporting means, this does not become as easily entangled with water vegetation as does say, a propeller-driven mini-boat.

BRIEF DESCRIPTION OF THE DRAWINGS

The invention is explained more in detail below with reference to the accompanying figures.

DESCRIPTION OF THE PREFERRED EMBODIMENTS

The invention relates more particularly to a means as for transporting the line and the bait attached to the line to the spot of fishing.

Figure 1A:
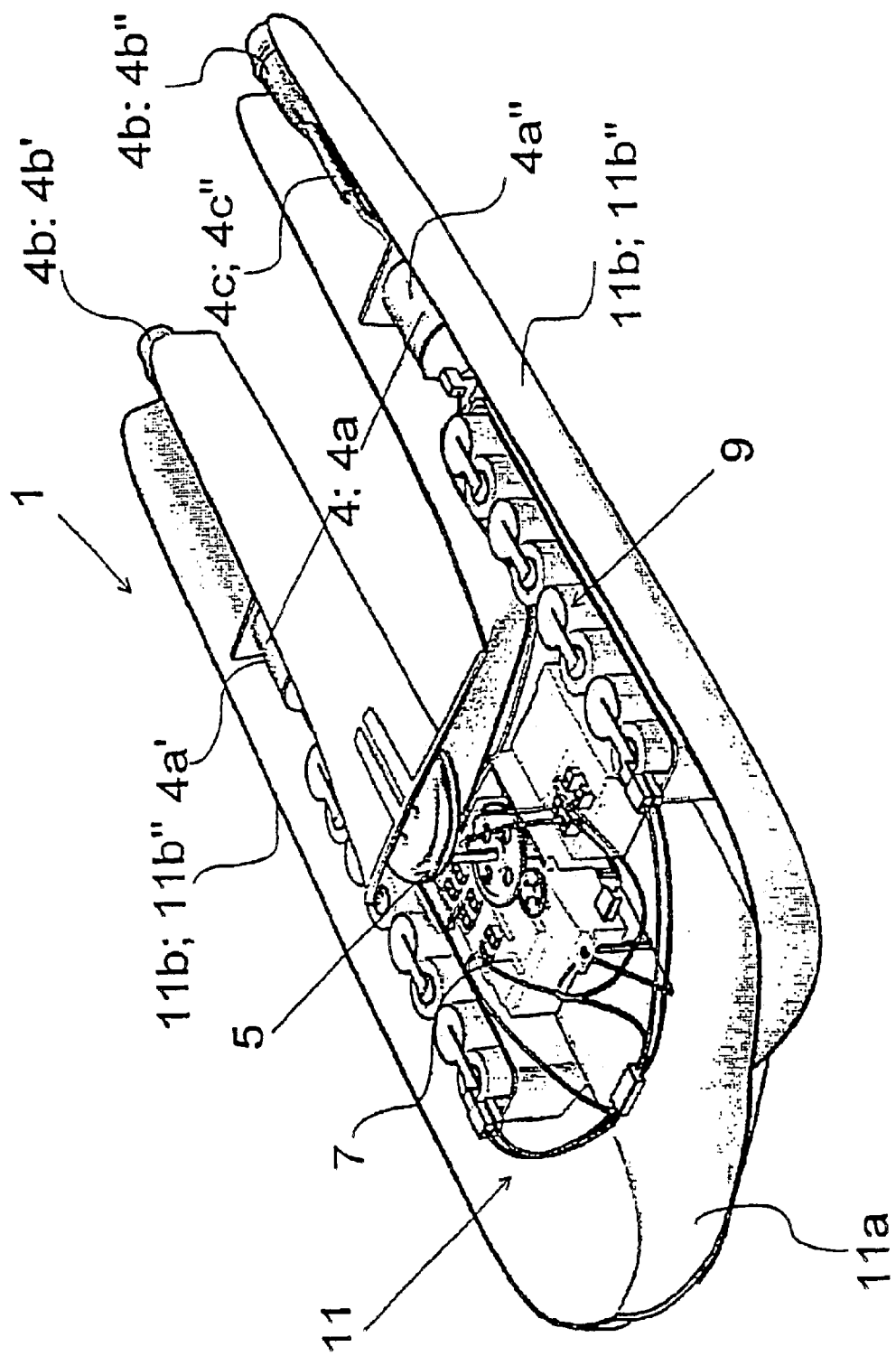
FIG. 1A is a perspective view of the transporting means, viewed from above and in section.

In FIG. 1A, the frame 11 of the transporting means 1 has two elongated guide branches 11$b$; 11$b$', 11$b$", connected by a support member 11$a$. The cross-sectional profile of the support member 11$a$ is roughly rectangular and it has a thickness in the longitudinal direction of the guide branches such that it can accommodate the engine members of the water-jet engine 4 controlling the movements of the means 1 and also a receiver 7. The receiver is a four-channel radio receiver using servo-assisted steering. The water-jet engine 4 comprises two engine members 4$a$; 4$a$', 4$a$", which inject water into two water transfer pipes 4$c$ provided in the guide branches 11$b$; 11$b$', 11$b$" of the transport member. The figure only shows one of the water-transfer pipes 4$c$; 4$c$".

Figure 1B:
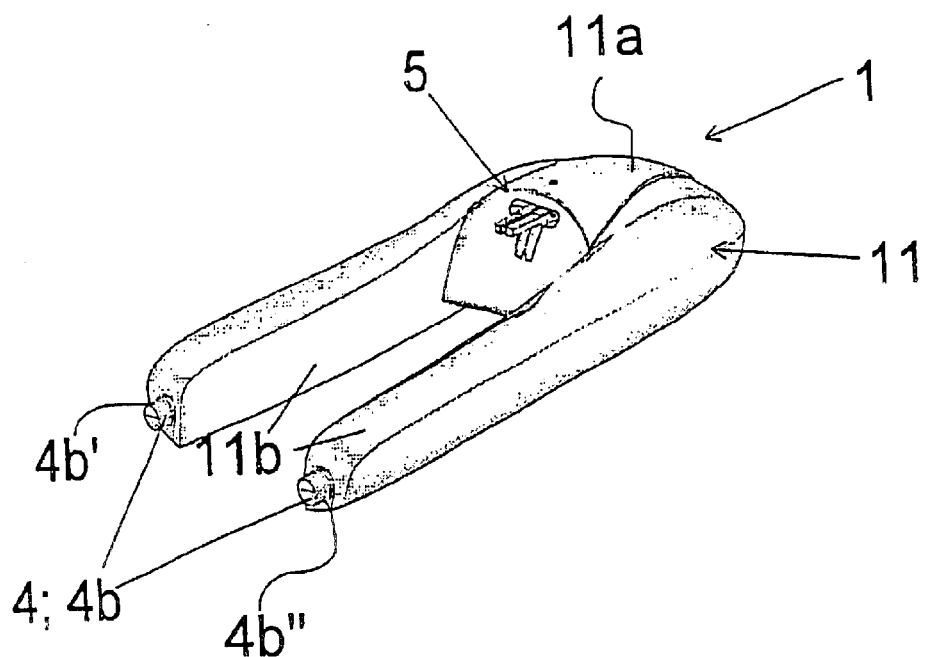
FIG. 1B shows the transporting means of FIG. 1A with the line and the bait.

The pressurised water passes from the water-transfer pipes to the nozzles 4$b$ ; 4$b$', 4$b$" of the water-jet engine 4 at the ends of the water-jet pipes, shown better in FIG. 1B, causing the transporting means to move on the action-reaction principle.

By studying the engine means. 4$a$; 4$a$', 4$a$" shown in FIG. 1A, it can be seen that they receive commands for controlling the water supply pressure from a receiver 7 located in the centre of the support member 11$a$. These control commands regulate the overall pressure of the water jet generated jointly by the engine members 4$a$; 4$a$', 4$a$" and determine the distribution of the overall pressure of the water jet between the engine members 4$a$; 4$a$', 4$a$". In addition, the transmitter emits activating and deactivating commands of the engines (on/off function) as well as commands for regulating the overall pressure of the water jet, controlling the speed of the transporting means. FIG. 1A also shows a line guide 5 located approximately at the centre of the inner edge of the support member 11; 11$a$ and the batteries 9 located in the guide branches.

Figure 2A:
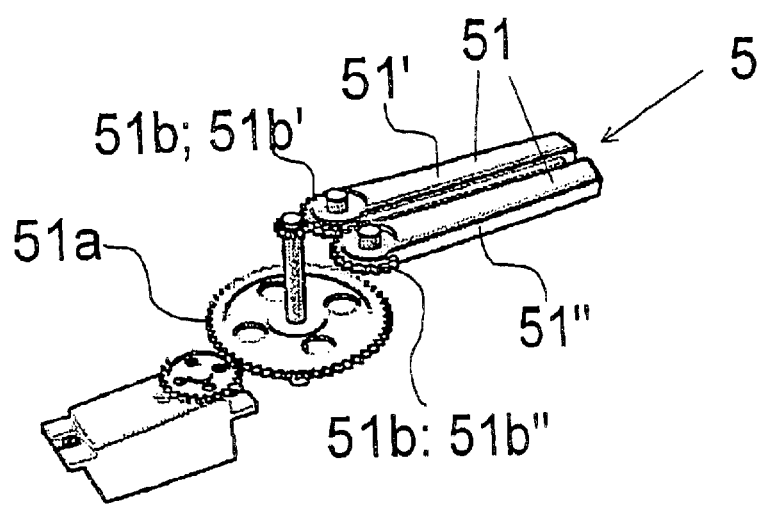
FIG. 2A shows the operating mechanism of the line guide.
Figure 2B:
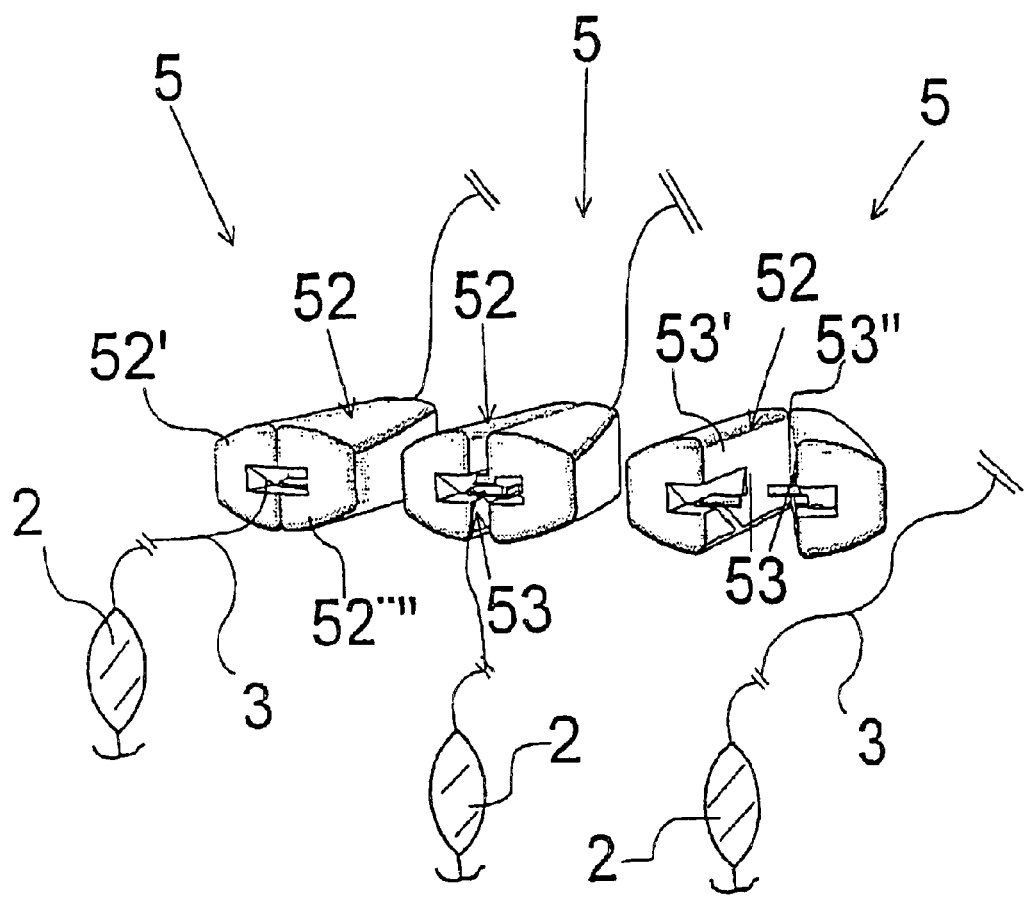
FIG. 2B shows the line guide in closed and open position in an oblique front perspective view.

The operating principle of the line guide 5 is best shown in FIGS. 2A and 2B. The parts of the line guide 5 shown in FIG. 2A including the locking arm 51 are located inside the support member of the frame 11 of the transporting means, whereas the locking members 52 of the line guide 5 shown in FIG. 2B are mainly located outside the frame. In FIG. 2A, the gear wheels 51$b$; 51$b$', 51$b$" of the locking arms 51 of the line guide 5 are driven by the intermediary of a toothed wheel 51a, which is connected to the first gear wheels 51b" of the locking arm 51". Control commands determining the direction of rotation are transmitted to the toothed wheel 51a over the receiver 7.

The locking arms shown in FIG. 2A are located within the locking members 52; 52', 52" shown in FIG. 2B, with the line 3 passing between the friction surfaces 53; 53'; 53" of the locking members 52. With the line guide 5 in locking position (viewed from the left in FIG. 2B, the first position of the locking members 52 of the line guide), the locking members 52; 52'; 52" press the line 3 tightly between the friction surfaces 53; 53'; 53", preventing the movements of the line 3 relative to the line guide 5 (locking function of the line guide). When the line guide 5 is in half released position (central position of the locking member 52 of the line guide), the friction surfaces 53 of the locking members do not prevent the line from passing freely, the line still passing through the line guide. When the line guide 5 is in released position (third position of the locking member 52 of the line guide viewed from the left), the line 3 and the lure 2 at its end are completely released from the line guide and the fisher controls the fish merely by means of the fishing device (release function of the line guide).

When the toothed wheel 51a shown in FIG. 2A is rotated clockwise, the locking arms 51; 51'; 51" of FIG. 2B are brought apart, thus releasing the line 3 to pass partly or totally freely between the friction surfaces 53; 53'; 53" of the locking members, so that the location of the line and the bait attached to it is allowed to change relative to the line guide 5 (two last positions of the line guide in FIG. 2B). When, in turn, the toothed wheel 51a is rotated counter-clockwise, the locking arms 51; 51'; 51" approach each other, finally locking the line between the friction surfaces 53; 53'; 53" of the locking members 52; 52'; 52" (first position of the line guide in FIG. 2B), the position of the line 3 and the bait 2 attached to it relative to the line guide 1 being locked in a given position.

Figure 3:
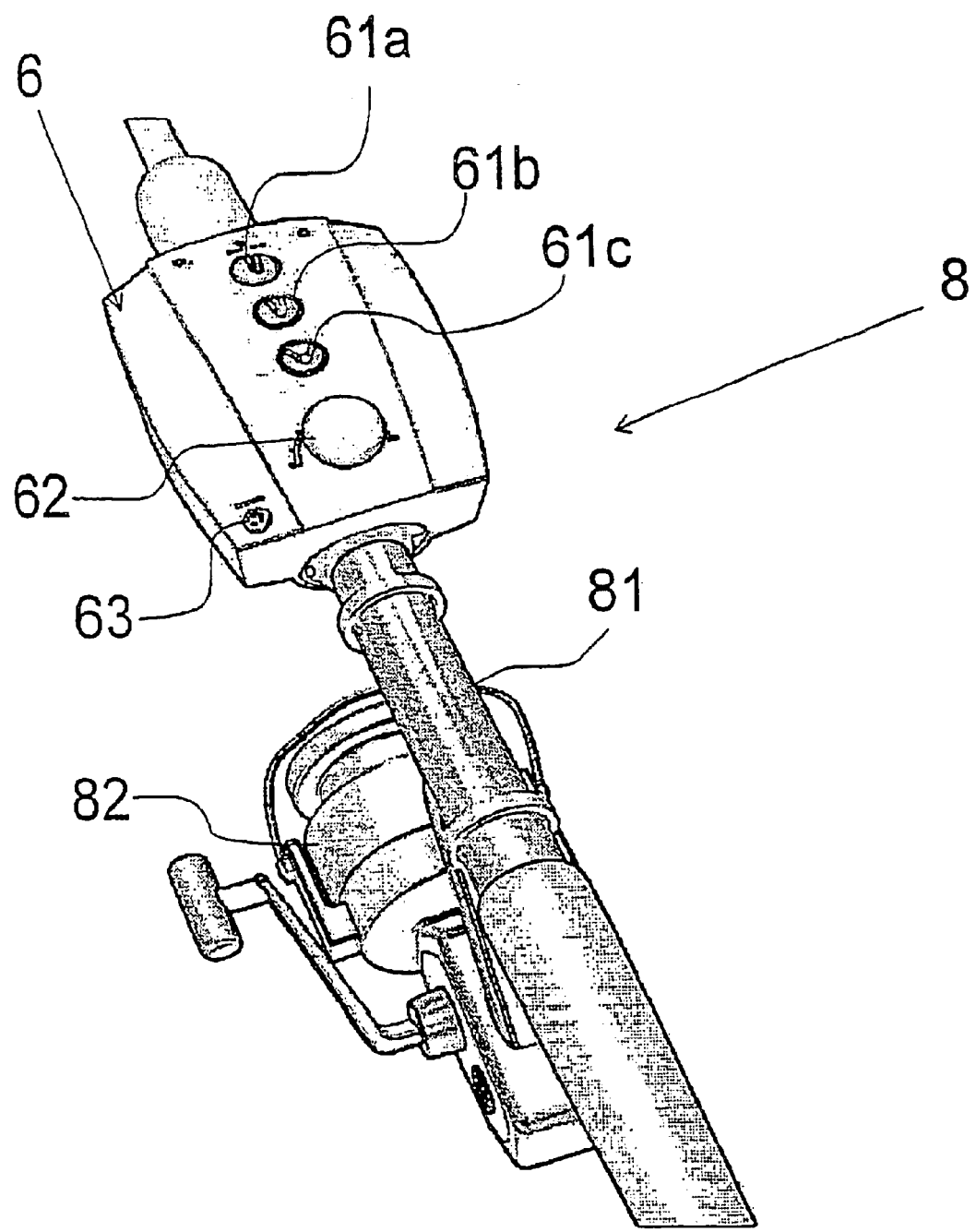
FIG. 3 is a perspective view of the control device attached to the pole.

FIG. 3 illustrates the design of the control means 6 which is attached to the pole 8; 81 of the fishing device and is used for controlling the functions of the line guide of the transporting means and those of the water-jet engine. The control means 6 contains a transmitter unit, which is either a conventional radio transmitter known per se, which is used in RC techniques and provides the receiver with control commands by modulating the carrier wave. Optionally, control commands can be transmitted to the receiver as text messages by means of GSM techniques known per se. The fishing device 8 is also known per se, comprising a fishing means 82 attached to the pole 81 and having a reel for winding and unwinding the line. The control means 6 is removably attached to the pole 8; 81 of the fishing device immediately above the reel 8; 82, being thus easy to use. Being releasable, the control means 6 can be used in different poles and varied environments. The control commands controlling the release and locking operations of the line guide are generated by means of a control button 61 and the control commands of the water-jet engine for regulating the relative water-jet pressure of the engine members and the overall pressure of the water jet are generated by means of the pressure regulator 62. In addition, the control means has an on/off switch 63, providing the control commands for switching the water-jet engine on and off.

The transporting means 1 of the invention is brought exactly to the desired spot of fishing by means of the pressure regulator 62 and the (on/off) switch 63. The pressure regulator 62 is of the joystick type, serving to adjust the mutual ratio of the pressure of the water jets generated by the engine members 4a; 4a', 4a" as well as the overall pressure of the water jet generated by these. The lateral motions of the pressure regulator relative to the pole are used to control the mutual ratio of the pressure of the water jets discharged through the nozzles 4b; 4b'; 4b" of the guide branch and the longitudinal motions of the pressure regulator pole are used to adjust the total overall pressure of the water jets discharged through the nozzles 4b of the guide branch. If the pressure of the water jets discharged through the nozzles 4b; 4b'; 4b" have identical pressure, the transporting means 1 will move along a straight trajectory. If, again, the water jet is discharged through either of the nozzles 4b; 4b'; 4b" under higher pressure than the water jet discharged through the other one, the transporting means 1 will turn in the direction of the guide branch from which the water jet is discharged, under lower pressure. By adjusting the overall pressure of the water jets, the speed of movement of the transporting means is varied. The operation of the engine members 4a is stopped by means of the switch 63 of the control means. When a fish bites the bait 3, the fisherman releases the line from the line guide 5 either completely 61c or partly 61b using the control button 61. When completely released from the line guide 61c, the line will no longer pass through the line guide and then the fisherman is controlling the fishing process entirely by means of the fishing device. When partly released from the line guide, the line will move freely relative to the line guide, while still passing through the line guide. When the bait is taken to the fishing spot, the line guide is locked into locking position 61a. Using the releasing and locking functions of the line guide 6, it is also easy to adjust the fishing depth of the bait 2, thus achieving the same depth for the bait as the depth achieved with depth regulators usually attached directly to the lure.

Only a number of embodiments of the transporting means of the invention and its control means have been described above, and it is obvious to a person skilled in the art that the invention can be implemented in many other ways without departing from the inventive idea defined in the claims.

Thus part of the functions of the line guide can also be automated, for instance with the release function of the line guide being automatic when a fish bites the bait. This can be done for instance with a movement sensor provided in the line guide for detecting any sudden tensioning of the line. The control means may also comprise different functions than and/or additional functions to those described above. The location of the locking members for the line guide on the frame of the transporting means is not necessarily the one shown in the figures, but the locking members may be located on the frame, for instance.

The frame of the transporting means can be equipped with a longitudinal steering arm extending upwardly from the plane of the frame in order to maintain the line in position relative to the water surface, allowing the transporting means to be used in fly-fishing.

The transporting means can also be equipped with other accessories to facilitate and animate the fishing process, such as for instance an echo depth sounder to facilitate the positioning of the fish.

The control means is preferably connected to the pole of the fishing means with a quick-connecting mechanism allowing it to be rapidly switched to another fishing device.

What is claimed is:

1. A device for transporting a line (3) and bait (2) attached to the line from a location of a fishing pole to which the line is attached to a spot of fishing remote from the location of the fishing pole, the device comprising:

a frame (11) with two elongated guide branches (11*b*; 11*b*', 11*b*") connected by a support member (11*a*), a water-jet engine (4) provided in the guide branches (11*b*) for moving said frame from the location of the fishing pole to the spot of fishing, a line guide (5) carried by said frame and releasably connected to the line, a receiver (7) carried by said frame and that receives control commands for controlling at least one of said engine and said line guide; and control means (6) physically attached to the fishing pole (8; 81) and separated from said frame for transmitting the control commands to said receiver.

2. The device as defined in claim 1, wherein the control means (6) is releasably connected to the pole.

3. The device as defined in claim 1, wherein the waterjet engine (4) is controlled with radio control by means of the control means (6).

4. The device as defined in claim 1, wherein the control means (6) comprises push-buttons (61,63) and a joystick (62) on an upper surface of the control means.

5. The device as defined in claim 2, wherein the waterjet engine (4) is controlled with radio control by means of the control means (6).

6. A combination of a remote controller and a watercraft comprising:

said watercraft being arranged and adapted to transport a fishing line from a location of a fishing pole to which the fishing line is attached to a fishing spot that is remote from the location of the fishing pole, and comprising a hull, a water-jet engine that propels said hull from the location of the fishing pole to the fishing spot, a line guide carried by said hull and releasably connected to the fishing line, and a receiver that is borne by said hull and that receives engine control commands and line guide control commands; and said remote controller being at the location of the fishing pole remote from the fishing spot and comprising a releasable attachment to the fishing pole and a transmitter transmitting the engine and line guide control commands to said receiver.

* * * * *